United States Patent Office 3,275,710
Patented Sept. 27, 1966

3,275,710
AIR-DRYING LINEAR POLYESTER RESINS
George S. Wooster, Hamburg, and Aloysius J. Kane, Buffalo, N.Y., assignors to Allied Chemical Corporation, New York, N.Y., a corporation of New York
No Drawing. Filed July 30, 1962, Ser. No. 213,137
10 Claims. (Cl. 260—863)

The present invention relates to new and improved coating compositions. More particularly, this invention relates to new polyester-vinyl copolymer coatings based on tetrahydrophthalic acid or anhydride which are air-drying at room or elevated temperatures. The new coatings are wax-free, mar and solvent resistant and possess excellent flexibility and impact strength.

Coatings based on polyester-vinyl copolymers are well-known and have received considerable attention due to their attractive appearance and outstanding physical and chemical properties. However, their usefulness as coating compositions is hindered by the fact that they are inhibited at the surface by oxygen in the atmosphere. Thus, if a coating of a standard polyester-vinyl composition is allowed to cure at room temperatures, this inhibiting effect of the oxygen will result in a soft, tacky, and soluble surface.

Various solutions for overcoming this oxygen-inhibiting problem have been suggested such as, for example, drying the coatings at a high temperature or adding to the polyester-vinyl systems substances such as paraffin waxes, which during the cure process reach the coating surface where they form a protective barrier against oxygen. However, drying at a high temperature is not practical for general use of a coating composition and the use of waxes leaves a film on the surface of the coating which must be removed by polishing or buffing. Even after the film has been removed, the coating surface often has an unattractive appearance.

Recent developments show that air-drying polyester-vinyl copolymerization products based on tetrahydrophthalic acid or anhydride dry rapidly to a tack-free state even at room temperature because the polymerization inhibiting action of oxygen does not occur. However, the usefulness of these compositions has been limited by serious defects, such as lack of mar resistance, sensitivity to solvents, and a slow drying time to tack-free state.

It has also been proposed to modify air-drying polyester-vinyl copolymerization products based on tetrahydrophthalic acid or anhydride with a poly-functional alcohol, such as glycerine. Resin modified in this manner possess increased mar and solvent resistance but tend to be somewhat brittle due to cross-linkage caused by the polyhydric alcohols. Thus, these compositions are not particularly useful where the coatings are likely to be subjected to flexing.

Accordingly, it is an object of the present invention to produce a polyvester-vinyl coating composition which air dries rapidly to a tack-free state at room or elevated temperatures.

Another object of the present invention is to produce such an air-drying polyester-vinyl coating composition which possesses good mar resistance, solvent resistance, abrasion resistance, and shear strength and is also highly flexible.

Still another object is to produce such an air-drying polyester-vinyl coating composition from readily available and inexpensive materials.

These and other objects will become apparent from the detailed description set forth hereinbelow.

It has now been discovered that when a proper mixture of tetrahydrophthalic acid or anhydride and an alpha-beta unsaturated dicarboxylic acid or anhydride is esterified with 1,5-pentane diol, the resulting linear, unsaturated polyester, when copolymerized with a vinyl monomer having at least one $CH_2=C<$ group, produces a resin having all of the aforementioned properties which are desirable in coating compositions. Hereinafter, whenever reference is made to a carboxylic acid, it is to be understood that the term also is intended to include the anhydride thereof, if one exists. The novel polyester-vinyl compositions of this invention air-dry extremely rapidly to a tack-free state even at room temperatures and also possess excellent mar and solvent resistance. In addition, the compositions are highly flexible apparently because they are derived essentially from a linear chain polyester.

To prepare the new and improved polyester resins, tetrahydrophthalic acid is reacted with an alpha-beta unsaturated dicarboxylic acid and 1,5-pentane diol. As will be readily appreciated by one skilled in the art, endomethylene tetrahydrophthalic acid may be used in place of tetrahydrophthalic acid. Suitable alpha-beta unsaturated dicarboxylic acids include, for example, fumaric acid and maleic acid. A great number of alcohols were investigated; however, 1,5-pentane diol was the only alcohol tested which produced polyester-vinyl compositions having all of the aforementioned desired properties. However, minor amounts up to about twenty percent of other diols and polyols can be substituted for part of the 1,5-pentane diol without substantially lowering the rapid drying time and mar resistance. Of course, by substituting small amounts of other diols and polyols, there may be noticeable changes in other physical properties such as flexibility, for example.

The proportion of tetrahydrophthalic acid should amount to 10 to 75 equivalents, preferably about 25 to 50 equivalents per 100 equivalents of total carboxylic acids present. Particularly good results are obtained by using about 50 equivalents of tetrahydrophthalic acid. The proportions of reactants used to produce the new polyesters are such that a slight excess of hydroxyl to carboxyl groups exists. For example, from about 102 to 110 equivalents, preferably about 105 equivalents of alcohol to 100 equivalents of acid are employed. (The ratio of OH groups to COOH groups is from about 1.02 to 1.10. preferably 1.05.)

The tetrahydrophthalic acid, alpha-beta unsaturated dicarboxylic acid, and 1,5-pentane diol are mixed with an inhibitor, such as hydroquinone (about 0.015 percent by weight of the expected yield of the polyester), and a vehicle such as xylene (sufficient to maintain reflux). This mixture is then charged to a reaction vessel where it is subjected to azeotropic refluxing under a blanket of inert gas such as nitrogen at a temperature within the range of 180 to 200° C. The esterification reaction is continued until it has proceeded to about 95 percent of completion as indicated by an acid number in the range of from about 25 to 40. The xylene is then distilled off from the esterification mixture after which said mixture is cooled to 100 to 110° C. in preparation for mixing with about 40-60 percent by weight of the total composition of a vinyl monomer which has at least one $CH_2=C<$ group.

Example 1 below is illustrative of the methods by which the new polyesters of this invention are prepared. It is not intended that the scope of this invention be limited to this specific example.

*Example 1*

A polyester was prepared by heating a mixture of 1.0 mol tetrahydrophthalic acid anhydride, 1.0 mol fumaric acid, and 2.1 mols 1,5-pentane diol in the presence of an amount of hydroquinone equal to 0.015 percent by weight of expected theoretical yield of polyester under azeotropic reflux conditions at 180 to 195° C. Xylene, in an amount sufficient to maintain reflux, was used as a vehicle. The esterification reaction was carried out to an acid number of 37.5. The xylene was then distilled off from the esterification mixture by heating for one hour at 180 to 185° C. at 20 to 25 mm. Hg. The polyester was then cooled to 100 to 110° C. and an equal weight of styrene mixed in. The whole mixture was rapidly cooled to 25° C. for storage.

*Examples 2–4*

Polyesters were prepared from 1.0 mol tetrahydrophthalic acid anhydride, 1.0 mol fumaric acid and 2.1 mols of an alcohol, as designated in Table I below, in the presence of hydroquinone by the method outlined in Example 1 above. The esterification reaction was stopped when the polyester attained the acid number shown in Table I. The resulting polyesters were blended with an equal weight of styrene and cooled for storage as described in Example 1.

TABLE I

| Example No. | Diol | Acid Number of Polyester |
| --- | --- | --- |
| 2 | 1,3-butylene glycol | 38.0 |
| 3 | 2-methyl-2-ethyl-1,3-propanediol | 28.1 |
| 4 | Neopentyl glycol | 40.0 |

*Example 5*

A polyester was prepared from 1.0 mol tetrahydrophthalic acid anhydride, 1.0 mol fumaric acid, and 2.2 mols propylene glycol by the method described in Example 1. The resulting polyester had an acid number of 38.3. This polyester was blended with an equal weight of styrene and cooled for storage as described in Example 1.

It should be noted that Example 1 is specific to the novel polyester-vinyl composition of the present invention. Examples 2 to 5 are concerned with the preparation of polyester-vinyl compositions wherein alcohols, other than 1,5-pentane diol, are used. A detailed comparison of the composition of Example 1 with those of Examples 2 to 5 will be made later.

The polyester-vinyl compositions of the present invention are cured by adding a suitable catalyst-promoter system immediately before use. Such catalyst-promoter systems include the well-known peroxides used in the presence of a conventional metallic salt promoter. Useful peroxide catalysts include, for example, benzoyl peroxide, acetyl peroxide, tetralin hydroperoxide, 1-hydroxy-cyclohexyl-hydroperoxide-1, tertiary-butyl hydroperoxide, and methylethyl ketone hydroperoxide. Useful metallic salt promoters include, for example, the naphthenates, resinates, linoleates, and other soluble salts of metals selected from the class consisting of cobalt, manganese, copper, iron, chromium, calcium, nickel, lead, vanadium, and others. The catalyst-promoter initates copolymerization of the polyester and the vinyl monomer thus effecting final cure of the polyester-vinyl resin.

To test and compare the polyester-vinyl compositions of Examples 1 to 5, coatings produced from these compositions were obtained on "Masonite" panels, which are made of pressed wood fibers, by pour-down. A wet film thickness of 10–15, or approximately 12, mils was used. Shortly before applying the coatings to the panels, a catalyst-promoter system comprising 0.063 percent by weight of cobalt as cobalt naphthenate, 0.011 percent by weight of zirconium metal (as "Zirco" drier, a zirconium organic complex marketed by Advanced Solvents and Chemical Division), and 1.5 percent by weight of "Lupersol DDM" (60 percent methyl ethyl ketone peroxides in 40 percent dimethyl phthalate) was added to the polyester-vinyl compositions. The amounts of the various catalyst compounds used are based on the weight of the total composition. To facilitate obtaining the coatings by pour-down, 200 p.p.m. of a high molecular weight silicone flow agent (General Electric Silicone Fluid XF-1018 or SF-1023) was added. All specimens were allowed to air-dry at room temperature.

The coatings thus prepared were tested for drying time and mar resistance. Drying time was tested as tack-free time which is the time in hours required for surface tack to disappear. Tack-free time was tested by periodically touching each coating until it lost its surface tack.

The mar resistance of the various coatings was tested by a method referred to as the "Taber" method which employs a Taber Shear/Scratch Tester (Model 203). In this method, weight is applied to a diamond-pointed tool which is precision-lapped to a 90° included angle with a 0.003″ radius on the point. This diamond-pointed tool is drawn over the surface of each specimen until a mar or scratch is produced. Visual comparisons of the specimens are made by adjusting the weight applied to the diamond-pointed tool until the first visible line or scratch that cannot be rubbed out with cotton appears on the specimen surface. The weight in grams applied to the diamond-pointed tool which causes such a visible mar or scratch is taken as the mar resistance value. The readings are accurate within a value of ±10.

The results of the foregoing tests are shown in Table II below:

TABLE II

| Polyester of Example No. | Tack-Free Time (hrs.) | Mar-Resistance Value |
| --- | --- | --- |
| 1 | 3–3½ | 50 (1 day); 130 (3 days). |
| 2 | >5, <18* | <10 (14 days). |
| 3 | >5, <18* | <10 (14 days). |
| 4 | >5, <18* | <10 (7 days). |
| 5 | >7 | <10 (14 days). |

*Observations were made on succeeding days.

From the results of the foregoing tests, it is readily apparent that the novel polyester vinyl compositions of this invention produce coatings which are superior in drying time to a tack-free state and mar resistance. In addition, the coatings produced from the novel polyester-vinyl composition of the present invention exhibit a clarity and gloss which excelled over any of the other coatings tested.

The illustrative examples herein shown and described merely typify the invention and are not considered to be limitations thereof. It will be apparent to those skilled in the art that numerous modifications may be made therein without departure from the spirit of the invention or the scope of the appended claims.

We claim:

1. An unsaturated linear polyester which comprises the esterification product of (a) about 10 to 75 equivalents per 100 equivalents of total carboxylic acids present of tetrahydrophthalic acid, (b) an alpha-beta unsaturated dicarboxylic component selected from the group consisting of fumaric acid and maleic acid, and (c) a polyol composition which contains at least 80 percent 1,5-pentane diol; there being about 102 to 110 equivalents of polyol per 100 equivalents of carboxylic acids present.

2. A polyester according to claim 1 which contains about 50 equivalents of tetrahydrophthalic anhydride per 100 equivalents of total carboxylic acids present.

3. A polymerizable unsaturated linear polyester which comprises the esterification product of (a) about 50 equivalents of tetrahydrophthalic anhydride per 100 equivalents of total carboxylic acids present, (b) fumaric acid, and (c) 1,5-pentane diol; there being about 102 to 110 equivalents of 1,5-pentane diol per 100 equivalents of total carboxylic acids.

4. A polymerizable composition comprising (a) a polyester as defined by claim 1 and (b) 40 to 60 percent by weight of the total composition of a vinyl monomer having at least one $CH_2=C<$ group.

5. An unsaturated coating resin solution as defined in claim 4 wherein the vinyl monomer is styrene.

6. A process for producing an unsaturated polyester composition comprising mixing together 10 to 75 equivalents of tetrahydrophthalic anhydride per 100 equivalents of total acids present, an alpha-beta unsaturated dicarboxylic component selected from the group consisting of maleic acid and fumaric acid, and a polyol composition which contains at least 80 percent 1,5-pentane diol, there being about 102 to 110 equivalents of polyol per 100 equivalents of total dicarboxylic acids present; and heating the mixture in a temperature range of 180 to 200° C. until a polyester having an acid number of from about 25 to 40 is obtained.

7. A process according to claim 6 wherein the polyester is cooled to from 100 to 110° C. and mixed with from 40 to 60 percent by weight of the total composition of a vinyl monomer having at least one $CH_2=C<$ group.

8. A process for producing an unsaturated polyester composition mixing together about 50 equivalents of tetrahydrophthalic anhydride per 100 equivalents of total carboxylic acids present, fumaric acid, and 1,5-pentane diol; there being about 102 to 110 equivalents of 1,5-pentane diol per 100 equivalents of total carboxylic acids present; and heating the mixture in temperature range of 180 to 200° C. until a polyester having an acid number of from about 25 to 40 is obtained.

9. A polyester-vinyl resin prepared by curing a polymerizable composition as defined in claim 4 in the presence of a peroxide catalyst and a metallic salt promoter for said catalyst.

10. A process for producing a cured polyester-vinyl resin comprising mixing together from 10-75 equivalents of tetrahydrophthalic anhydride per 100 equivalents of total acids present, an alpha-beta unsaturated dicarboxylic component selected from the group consisting of maleic acid and fumaric acid, and a polyol composition which contains at least 80 percent 1,5-pentane diol; there being about 102 to 110 equivalents of polyol per 100 equivalents of total carboxylic acids present; heating the mixture in a temperature range of 180 to 200° C. until a polyester having an acid number from about 25 to 40 is obtained; cooling the polyester to from 100 to 110° C.; mixing said cooled polyester with from 40 to 60 percent by weight of the total composition of a vinyl monomer having at least one $CH_2=C<$ group; and adding a peroxide catalyst and a metallic salt promoter for said catalyst.

References Cited by the Examiner

UNITED STATES PATENTS

| | | | |
|---|---|---|---|
| 2,453,665 | 11/1948 | Kropa | 260—861 XR |
| 2,453,666 | 11/1948 | Kropa | 260—861 XR |
| 2,475,731 | 7/1949 | Weith | 260—75 |
| 2,562,878 | 8/1951 | Blair | 260—75 XR |
| 2,951,823 | 9/1960 | Sauer | 260—75 XR |
| 2,973,332 | 2/1961 | Fikentscher et al. | 260—75 |
| 3,004,003 | 10/1961 | Batzer | 260—75 |

FOREIGN PATENTS 842,958   8/1960   Great Britain.

WILLIAM H. SHORT, *Primary Examiner.*

LOUISE P. QUAST, *Examiner.*